United States Patent
Sen et al.

(10) Patent No.: US 11,281,787 B2
(45) Date of Patent: Mar. 22, 2022

(54) ELECTRONIC DEVICE WITH SENSOR TO DETECT FIRST AND SECOND CODES AND TO FURTHER PERFORMS FIRST AND SECOND DIGITAL SCAN OF PRINT MEDIUM

(71) Applicant: Hewlett-Packard Development Company, L.P., Spring, TX (US)

(72) Inventors: Bibartan Sen, Bangalore (IN); Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,629

(22) PCT Filed: Apr. 9, 2019

(86) PCT No.: PCT/US2019/026444
§ 371 (c)(1),
(2) Date: Oct. 14, 2020

(87) PCT Pub. No.: WO2019/236189
PCT Pub. Date: Dec. 12, 2019

(65) Prior Publication Data
US 2021/0110051 A1  Apr. 15, 2021

(30) Foreign Application Priority Data
Jun. 5, 2018 (IN) .............................. 201841020976

(51) Int. Cl.
*G06F 3/12* (2006.01)
*G06F 21/60* (2013.01)
*G06F 21/32* (2013.01)

(52) U.S. Cl.
CPC .......... *G06F 21/608* (2013.01); *G06F 3/1222* (2013.01); *G06F 3/1238* (2013.01); *G06F 21/32* (2013.01); *G06F 3/1231* (2013.01)

(58) Field of Classification Search
None
See application file for complete search history.

(56) References Cited

U.S. PATENT DOCUMENTS

| | | | |
|---|---|---|---|
| 5,633,932 A | 5/1997 | Davis et al. | |
| 7,126,707 B2 * | 10/2006 | Takeo | H04N 1/00236 358/1.15 |
| 7,380,121 B2 | 5/2008 | Nomura et al. | |
| 8,139,241 B2 | 3/2012 | Okada | |
| 8,717,593 B2 | 5/2014 | Kakegawa | |
| 9,497,173 B2 | 11/2016 | Snow et al. | |
| 9,749,499 B2 | 8/2017 | Mashimo | |
| 9,760,697 B1 | 9/2017 | Walker | |
| 9,762,553 B2 | 9/2017 | Ford et al. | |

(Continued)

*Primary Examiner* — Haris Sabah
(74) *Attorney, Agent, or Firm* — HP Inc. Patent Department

(57) ABSTRACT

An example electronic device includes a sensor to detect a first code and initiate a first digital scan of a print medium; a scanner to perform the first digital scan of the print medium upon detection of the first code by the sensor; and a processor to correlate the first code with a first digital scan of the print medium; identify a second code detected by the sensor; detect a second digital scan of the print medium by the scanner; and compare the first code with the second code.

14 Claims, 13 Drawing Sheets

(56) References Cited

U.S. PATENT DOCUMENTS

| | | | |
|---|---|---|---|
| 2005/0273865 A1 | 12/2005 | Slijp | |
| 2007/0014442 A1* | 1/2007 | Yu | H04N 1/4406 |
| | | | 382/124 |
| 2007/0206218 A1* | 9/2007 | Ohmori | G03G 15/5066 |
| | | | 358/1.15 |
| 2007/0220614 A1 | 9/2007 | Ellis et al. | |
| 2009/0073517 A1 | 3/2009 | Kuroda | |
| 2011/0052096 A1 | 3/2011 | Piersol | |
| 2012/0320403 A1* | 12/2012 | Kakutani | H04N 1/00846 |
| | | | 358/1.14 |
| 2014/0054364 A1* | 2/2014 | Yamauchi | H04N 1/32144 |
| | | | 235/375 |
| 2015/0043023 A1* | 2/2015 | Ito | G06K 19/086 |
| | | | 358/1.14 |
| 2015/0160897 A1* | 6/2015 | Mori | G06F 3/1292 |
| | | | 358/1.13 |
| 2016/0150124 A1* | 5/2016 | Panda | H04N 1/4433 |
| | | | 358/1.13 |
| 2018/0157448 A1* | 6/2018 | Takaoka | G06F 3/1204 |

\* cited by examiner

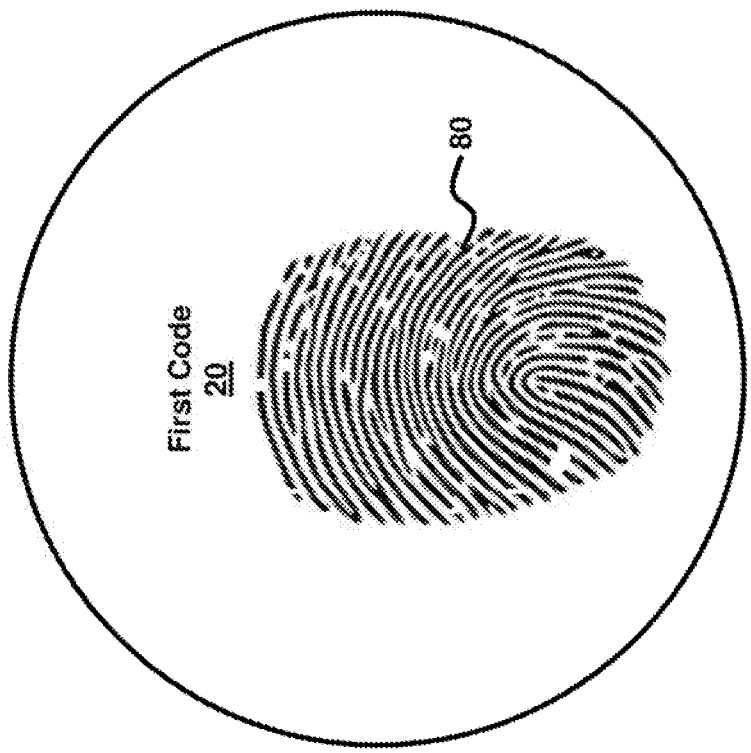
FIG. 6

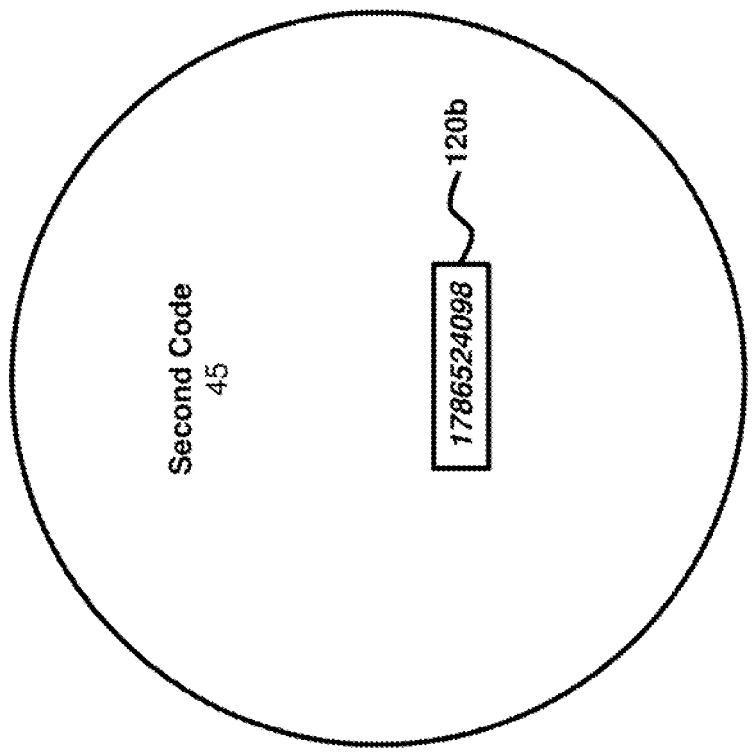
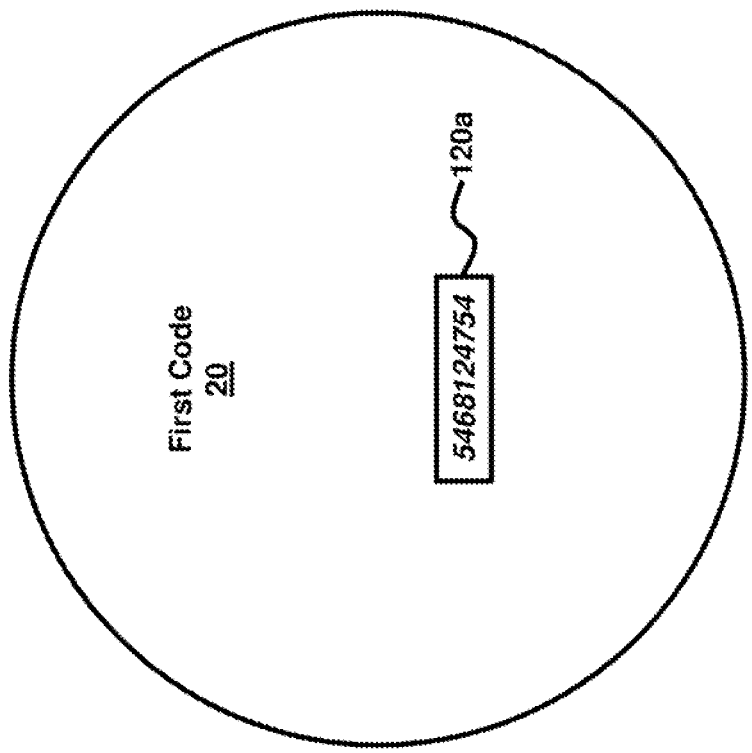
FIG. 8

ELECTRONIC DEVICE WITH SENSOR TO DETECT FIRST AND SECOND CODES AND TO FURTHER PERFORMS FIRST AND SECOND DIGITAL SCAN OF PRINT MEDIUM

BACKGROUND

Electronic devices such as printers, scanners, and copiers allow for the replication of a print medium. The original print medium document is often placed in the electronic device to conduct the replication. The original print medium may contain confidential or sensitive information.

BRIEF DESCRIPTION OF THE DRAWINGS

The following detailed description references the drawings, in which:

FIG. 6 is a block diagram illustrating the codes of FIG. 1 containing fingerprints, according to an example.

FIG. 8 is a block diagram illustrating the codes of FIG. 7 containing pin numbers, according to an example.

Figure 1:
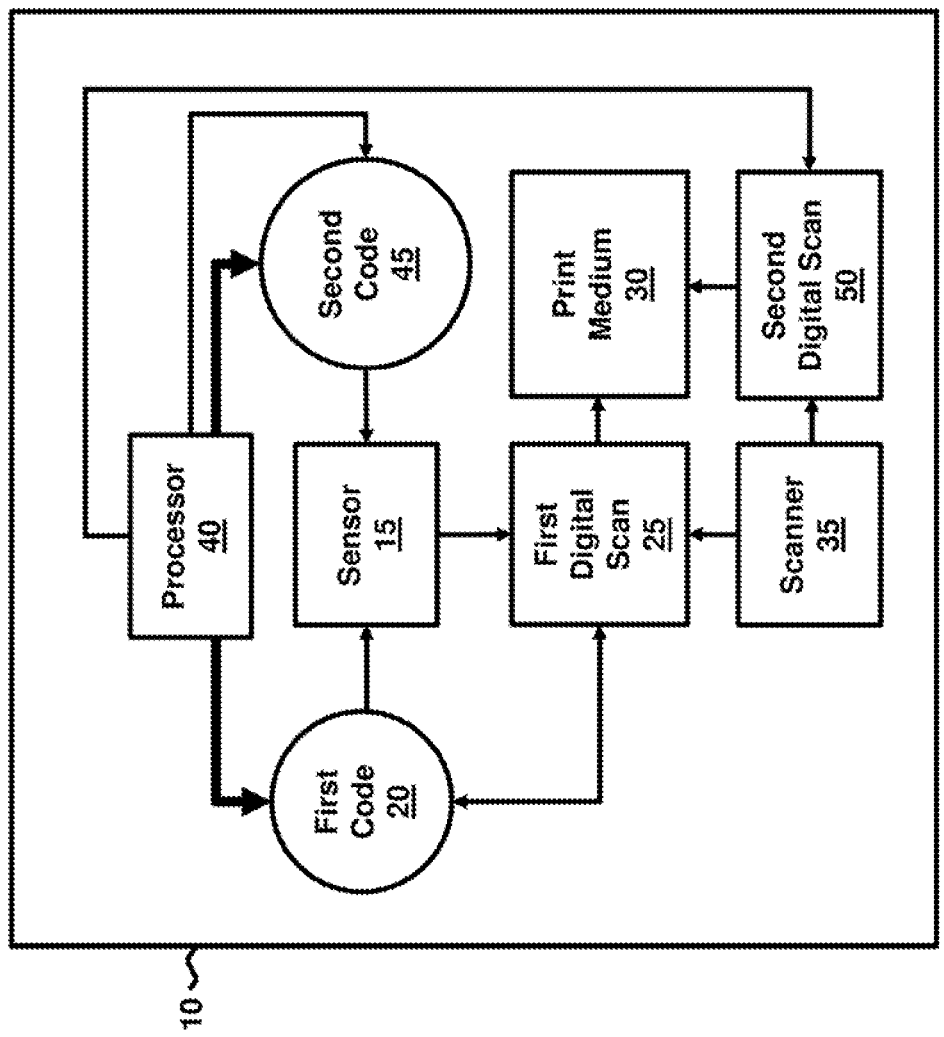
FIG. 1 is a block diagram illustrating an electronic device to detect and compare codes associated with digital scans of a print medium, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In an enterprise environment where printers are shared, the users of such devices will often be handling confidential documents and it is very important for the users to be extremely alert and to ensure that the confidential information is kept intact. However, due to human error caused by leaving original input media in printers, scanners, and copiers after completion of a replication task, the threat of disclosure of the confidential information becomes an increased probability. Indeed, it may take some time before the user realizes that the original, media was left behind. During this time, any other individual may come forward to claim the original input media or make a scan or copy of it thereby resulting in disclosure of the confidential information. Depending on the sensitivity of the disclosed confidential information, such a disclosure may have a severe adverse impact to the original user and/or the enterprise.

In order to address this, the examples described below provide a technique to protect the scanning and copying of confidential material. In some situations, a user of a scan/copier machine or electronic device leaves the original scan/copy document in the machine after completion of the scan/copy task. The document may contain confidential information and it is undesirable for others to be able to make a subsequent scan/copy of the material contained in the document. In a first example, a user scan/copies a document by pressing a button on the machine; e.g., a start button with his/her finger. The machine scans the document and associates the scanned contents to a digital fingerprint of the user captured by the start button. If a subsequent request is made to scan/copy the same document, then the machine compares the digital fingerprint captured by the subsequent pressing of the start button with the scanned contents of the document to determine it the digital fingerprint is associated with the original user. If it is not, then the scan/copy request is denied. In a second example, a pin is established instead of a fingerprint to prevent unauthorized scan/copy of the document for a predefined duration of time. In a third example, the machine includes a near field communication tag that is communicatively linked to the user's smartphone using a mobile security software application (app), for example. Upon completing a scan/copy job if the machine and smartphone become communicatively unpaired, then the machine performs another scan/copy job to determine if a document is still in the machine. If a document is detected, then the machine sends a message to the smartphone.

In some examples, the various devices, sensors, processors, and modules described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing, operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

FIG. 1 illustrates an electronic device 10 comprising a sensor 15 to detect a first code 20 and initiate a first digital scan 25 of a print medium 30. In an example, the electronic device 10 may comprise a printer, scanner, copier, or multifunction device containing a combination of printing, scanning, and copying functionalities. For example, the electronic device 10 may contain one or more scanning modules to perform a digital scan of the print medium 30. As referred to herein, the term printable or print medium or media may refer to one or more sheets of paper or any other media suitable for insertion into an electronic device 10 such as a printer, scanner, or copier. The print medium 30 may be any type of punt medium including paper, photopolymers, thermopolymers, plastics, composite, metal, wood, etc., and may include any suitable feature including the size, shape, material, thickness, or any other quality suitable for placement in the electronic device 10.

In examples, the sensor 15 may be an electro-mechanical sensor, optical sensor, laser rangefinder system, force gauge, or spring force sensor. In another example, the sensor 15 may comprise a button, such as a start button associated with the electronic device 10 to start or initiate the first digital scan 25 of the print medium 30. The first code 20 may be an alphanumeric and/or symbol string of characters, a digital image, or any other type of suitable password that is user-specific, and may be automatically generated by the electronic device 10 or it may be user-generated. The sensor 15 is provided to determine when the first code 20 has been entered into a user interface of the electronic device 10, and in some examples the first code 20 is directly or indirectly input into the sensor 15. Accordingly, the sensor 15 is able to detect the first code 20 based on this direct or indirect input. Once the sensor 15 detects the first code 20, the sensor 15 initiates the first digital scan 25 of the print medium 30. The electronic device 10 may be provided to only permit printing, scanning, or copying upon the entry of a code; e.g., the first code 20, etc. Accordingly, in order to initiate the first digital scan 25 of the print medium 30, the sensor 15 detects the first code 20.

A scanner 35 is provided to perform the first digital scan 25 of the print medium 30 upon detection of the first code 20 by the sensor 15. The scanner 35 may include scanning modules that make a digital copy of the print medium 30. In an example, the scanner 35 automatically performs the first digital scan 25 of the print medium 30 once the sensor 15 detects the first code 20. The digital scan 25 of the print medium 30 may be an electronic digital scan of the print medium 30 or the digital scan 25 may result in a hardcopy print out of a duplicate copy or copies of the print medium 30.

A processor 40 is provided to correlate the first code 20 with the first digital scan 25 of the print medium 30. In some examples, the processor 40 may comprise a central processing unit (CPU) of the electronic device 10. In other examples the processor 40 may be a discrete component independent of other processing components in the electronic device 10. In other examples, the processor 40 may be a microprocessor, controller, hardware engine, hardware pipeline, and/or other hardware-enabled device suitable for receiving, processing, operating, and performing various functions required by the electronic device 10. The processor 40 may be provided in the electronic device 10, coupled to the electronic device 10, or communicatively linked to the electronic device 10 from a remote networked location according to various examples. The correlation of the first code 20 with the first digital scan 25 of the print medium 30 may occur by linking or otherwise associating the first code 20 with the first digital scan 25 of the print medium 30. For example, the processor 40 may automatically assign the first digital scan 25 of the print medium 30 the specific first code 20 once the sensor 15 detects the first code 20 and the first digital scan 25 of the print medium 30 is initiated by updating the firmware of the electronic device 10 or by appending the first code 20 to a file name or directory associated with the first digital scan 25 of the print medium 30.

The processor 40 is further provided to identify a second code 45 detected by the sensor 15, and to detect a second digital scan 50 of the print medium 30 by the scanner 35. The second code 45 may be an alphanumeric and/or symbol string of characters, a digital image, or any other type of suitable password that is user-specific, and may be automatically generated by the processor 40 or it may be user-generated. The sensor 15 may detect the second code 45 after the sensor 15 detects the first code 20. For example, the sensor 15 may detect the first code 20 that is associated with, and input by, a first user and initiate the first digital scan 25 of the print medium 30. Then, the first user may walk away from the electronic device 10 leaving behind the print medium 30 in the electronic device 10. Thereafter, a second user may engage the electronic device 10 by inputting the second code 45 that may be associated with the second user. The electronic device 10 may be provided to only permit printing, scanning, or copying upon the entry of a code; e.g., the second code 45, etc. Accordingly, in order to initiate the second digital scan 50 of the print medium 30 by the scanner 35, the sensor 15 detects the second code 45, and once the detection occurs, the processor 40 identifies the second code 45.

The processor 40 is further provided to compare the first code 20 with the second code 45. In this regard, the first code 20 that is detected by the sensor 15 is retained in memory or cache or provided as a firmware update, etc. by the electronic device 10. More specifically, the correlation of the first code 20 with the first digital scan 25 of the print medium 30 is retained in memory or cache or provided as a firmware update, etc. by the electronic device 10. Once the second code 45 is detected by the sensor 15 in order to initiate the second digital scan 50 of the print medium 30, the processor 40 compares the digital signatures associated with the first code 20 and the second code 45 to determine whether there is a match between the first code 20 and the second code 45. More specifically, the correlation of the first code 20 with the first digital scan 25 of the print medium 30 is compared with the digital data associated with the second digital scan 50 of the print medium 30.

If there is a match between the first code 20 and the second code 45, then the processor 40 transmits a signal to the scanner 35 to continue performing the second digital scan 50 of the print medium 30. However, if there is not a match between the first code 20 and the second code 45, then the processor 40 either does not transmit a signal to the scanner 35 thereby preventing the continued performance of the second digital scan 50 of the print medium 30 or the processor 40 transmits a signal to the scanner 35 instructing the scanner 35 not to continue to perform the second digital scan 50 of the print medium 30.

In accordance with the examples described above, the first code 20 may be the same as the second code 45 in a scenario where the first user and the second user are the same individual or if the second user has received a full copy of the first code 20 and as such the second code 45 is a duplicate of the first code 20 thereby resulting in a detected match by the processor 40. However, the first code 20 and the second code 45 may be completely separate and distinct from one another in which case there is no match detected by the processor 40.

Figure 2:
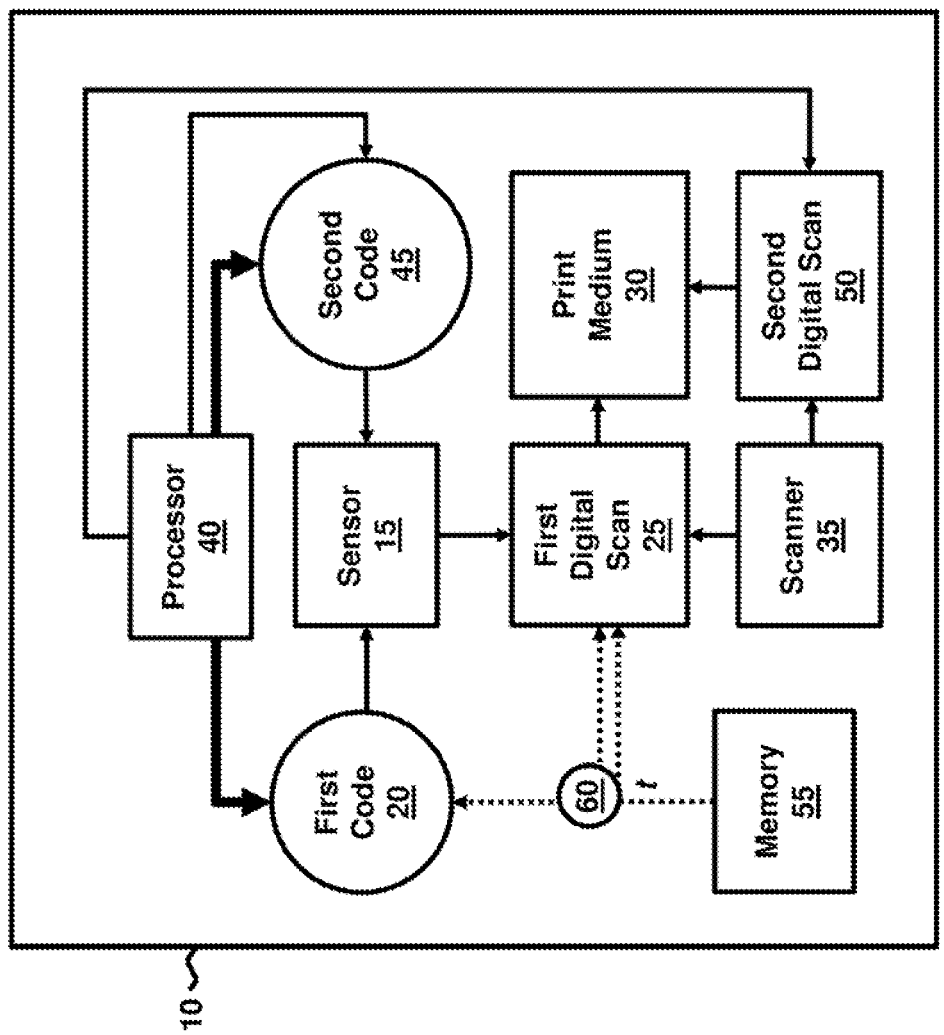
FIG. 2 is a block diagram illustrating the electronic device of FIG. 1 including a memory and a correlated mapping of a code with a digital scan, according to an example.

FIG. 2, with reference to FIG. 1, illustrates that the electronic device 10 may comprise a memory 55 to store the first digital scan 25 of the print medium 30 for a predetermined period of time t. In some examples, the memory 55 may be non-volatile memory of the electronic device 10 including flash memory, read-only memory (ROM), programmable read-only memory (PROM), erasable programmable read-only memory (EPROM), or electrically erasable programmable read-only memory (EEPROM). In other examples, the memory 55 may be volatile memory such as a cache memory. The memory 55 may be provided in the electronic device 10, coupled to the electronic device 10, or communicatively linked to the electronic device 10 from a remote networked location according to various examples. The predetermined period of time t may be programmable by the processor 40 or provided by firmware updates to the electronic device 10, according to some examples. In various examples, the predetermined period of time t may range from a few seconds to several minutes. In an example, the predetermined period of time t may be between approximately three minutes and ten minutes. The processor 40 is to create a correlated mapping 60 of the first code 20 with the first digital scan 25 of the print medium 30, and delete the correlated mapping 60 after the predetermined period of time t. By temporarily storing the first digital scan 25 for only the predetermined period of time t, system resources and storage requirements for the memory 55 may be eased. In an example, the correlated mapping 60 may refer to the above referenced correlation of the first code 20 with the first digital scan 25 of the print medium 30.

Figure 3:
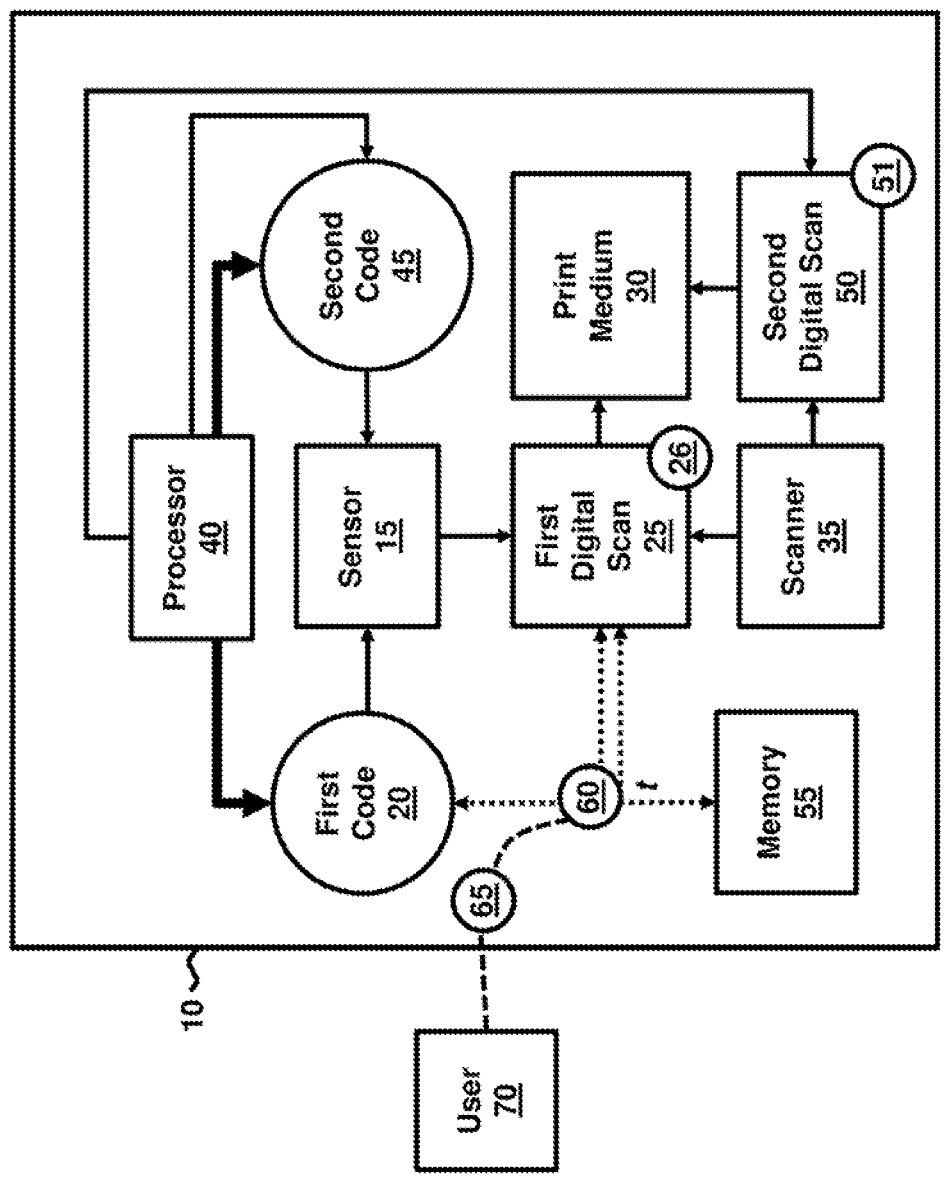
FIG. 3 is a block diagram illustrating the electronic device of FIG. 1 with identification data of a user provided with a correlated mapping of a code with a digital scan, according to an example.

FIG. 3, with reference to FIGS. 1 and 2, illustrates that the correlated mapping 60 may comprise identification data 65 associated with a user 70 of the electronic device 10. In an example, the identification data 65 may include various types of information associated with the user 70 including any of a phone number, email address, identification number, social security number, image/photograph, and any other type of identifier. According to an example, the user 70 may be a pre-registered user 70 that provides the identification data 65, which may be stored in memory 55 or may be provided as part of firmware updates to the electronic device 10, or may be remotely stored in a database that is accessible by the processor 40. Accordingly, the correlated mapping 60 links or otherwise associates the identification data 65 of the user 70 to the digital data 26 associated with first digital scan 25 of the print medium 30, and the processor 40 uses the correlated mapping 60 as a comparison or guide for all subsequent requests for digital scanning; e.g., the second digital scan 50, of the same print medium 30.

Figure 4:
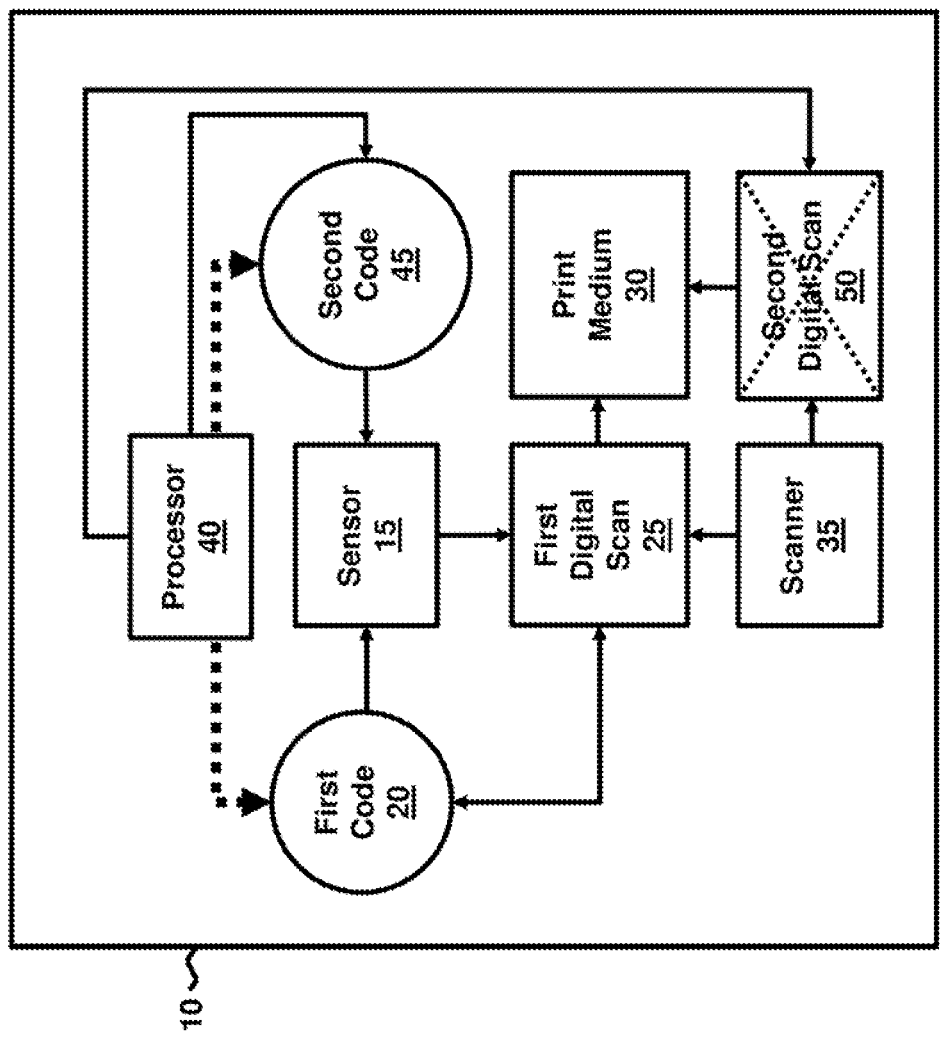
FIG. 4 is a block diagram illustrating the processor of the electronic device of FIG. 1 deleting a digital scan based on a comparison of digital codes, according to an example.

FIG. 4, with reference to FIGS. 1 through 3, illustrates that the processor 40 is to delete the second digital scan 50 upon determining that the first code 20 does not match the second code 45. Accordingly, the processor 40 may delete the second digital scan 50 from memory 55 if there is no matching between the first code 20 and the second code 45. This prevents replication of the scan of the print medium 30 after the first digital scan 25, at least until a second code 45 is detected by the sensor 15 that matches the first code 20.

Figure 5:
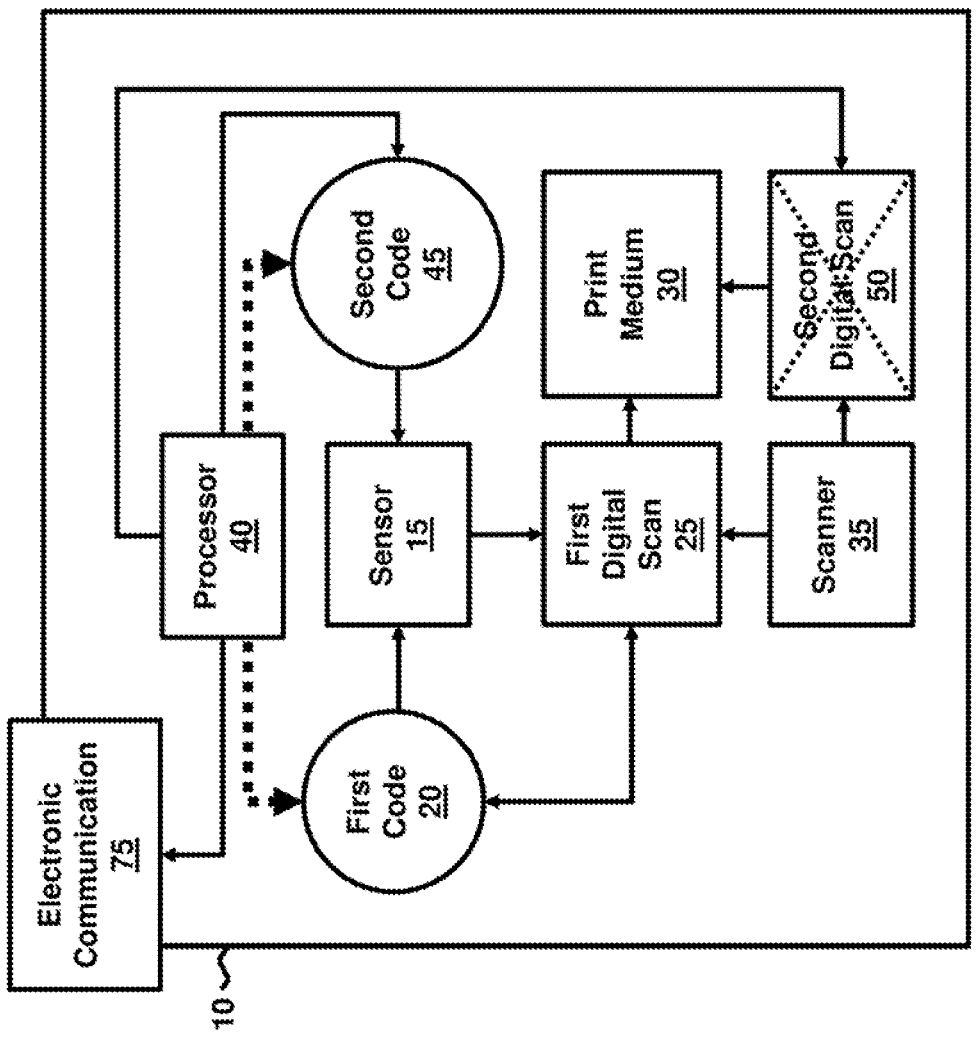
FIG. 5 is a block diagram illustrating the processor of the electronic device of FIG. 1 transmitting an electronic communication based on a comparison of digital codes, according to an example.

FIG. 5, with reference to FIGS. 1 through 4, illustrates that the processor 40 is to transmit an electronic communication 75 upon determining that the first code 20 does not match the second code 45. In this regard, the electronic communication 75 may be an email message, short message service (SMS) text message, phone call, or any other type of electronic alert transmitted to the user 70. For example, the user 70 may leave the area of the electronic device 10 after completing the first digital scan 25 of the print medium 30; e.g., upon inputting the first code 20, and forget to remove the print medium 30 from the electronic device 10. When a subsequent user attempts to perform the second digital scan 50 of the same print medium 30 and enters the second code 45, if the first code 20 does not match the second code 45, then the original user 70 will receive the electronic communication 75 from the processor 40, which will alert the user 70 that he/she left the print medium 30 in the electronic device 10 and also that a subsequent attempt to copy or scan the print medium 30 was attempted. In another example, the electronic communication 75 may be provided to the user 70 in the form of a mobile software application (app) or on a computer desktop, laptop, or tablet device app that automatically becomes triggered once the electronic communication 75 is transmitted by the processor 40.

FIG. 6, with reference to FIGS. 1 through 5, illustrates that the first code 20 may comprise a first fingerprint 80, and the second code 45 may comprise a second fingerprint 85. In this regard, the sensor 15 may be a fingerprint scanning sensor that detects the first fingerprint 80 and the second fingerprint 85. In an example, the sensor 1 may be embedded in a start button of the electronic device 10, which is typically initiated by a user 70 touching the button with his/her finger. In the example of FIG. 6, the first fingerprint 80 and the second fingerprint 85 may be the same. In this case, there would be a match between the first code 20 and the second code 45; i.e., between the first fingerprint 80 and the second fingerprint 85, in which case the complete second digital scan 50 of the print medium 30 would be permitted by the processor 40. However, the first fingerprint 80 and the second fingerprint 85 may not be the same, in which case there would not be a match between the first code 20 and the second code 45; i.e., between the first fingerprint 80 and the second fingerprint 85, and accordingly the complete second digital scan 50 of the print medium 30 would not be permitted by the processor 40.

Accordingly, as described above with respect to the examples shown in FIGS. 1 through 6, the sensor 15 may be the start button of the electronic device 10, which can initiate a scan, copy, or print function of the electronic device 10. The sensor 15 can be set to recognize fingerprints; e.g., first fingerprint 80 and second fingerprint 85, etc. In an example, the user 70 may be a registered user of the electronic device 10 having his/her identification data 65 mapped to his/her fingerprint: e.g., first fingerprint 80. However, if the user 70 is not a registered user of the electronic device 10, the user 70 may enter his/her identification data 65 into the electronic device 10 or through a communicative link to the electronic device 10. The user 70 may then place the print medium 30 in or on the electronic device 10 and select the preferred settings for performing a scan, copy, or print function. Next, the user 70 may engage the sensor 15; e.g., pressing the sensor 15 to initiate the scan, copy, or print function. The firmware as controlled by the processor 40 of the electronic device 10, and as processed by scanner 35 may then scan the print medium 30 as the first digital scan 25 and map; e.g., the correlated mapping 60, the contents contained in the print medium 30 to the first fingerprint 80 that is detected by the sensor 15 of the current user 70 who is operating the electronic device 10. The correlated mapping 60 is stored in the memory 55 for the predetermined period of time t. If the second digital scan 50 of the print medium 30 is performed, or attempted to be performed, by a subsequent user, then the digital data 26 associated with the first digital scan 25 of the print medium 30 is compared with the correlated mapping 60 that is stored in the memory 30 and if a match is found between the digital data 26 of the first digital scan 26 and the digital data 31 of the second digital scan 50, then the processor 40 attempts to validate or compare the current second fingerprint 85 with the previously saved first fingerprint 80. If the second fingerprint 85 associated with the second digital scan 50 does not match the first fingerprint 80 associated with the first digital scan 25, then the second digital scan 50 is terminated with a corresponding electronic communication 75 transmitted to the user 70 or output by the electronic device 10; e.g., displayed on a user interface of the electronic device 10, etc. As such, the user 70 may receive the electronic communication 75 indicating that a subsequent user has attempted to scan or copy the print medium 30 and that the user 70 should return to the electronic device 10 to retrieve the print medium 30. Once the predetermined period of time t expires, the correlated mapping 60 may be deleted from the memory 55.

In another example, if the scan bed lid of the electronic device 10 is not opened or otherwise accessed for a pre-defined duration of time e.g., approximately three minutes, etc., after completion of the first digital scan 25 of the print medium 30, then the firmware as controlled by the processor 40 interprets that the original print medium 30 was not retrieved by the user 70 after completion of the first digital scan 25. As such, the processor 40 transmits the electronic communication 75 to the user 70 based on the identification data 65 notifying the user 70 that the print medium 30 remains in the electronic device 10.

Figure 7:
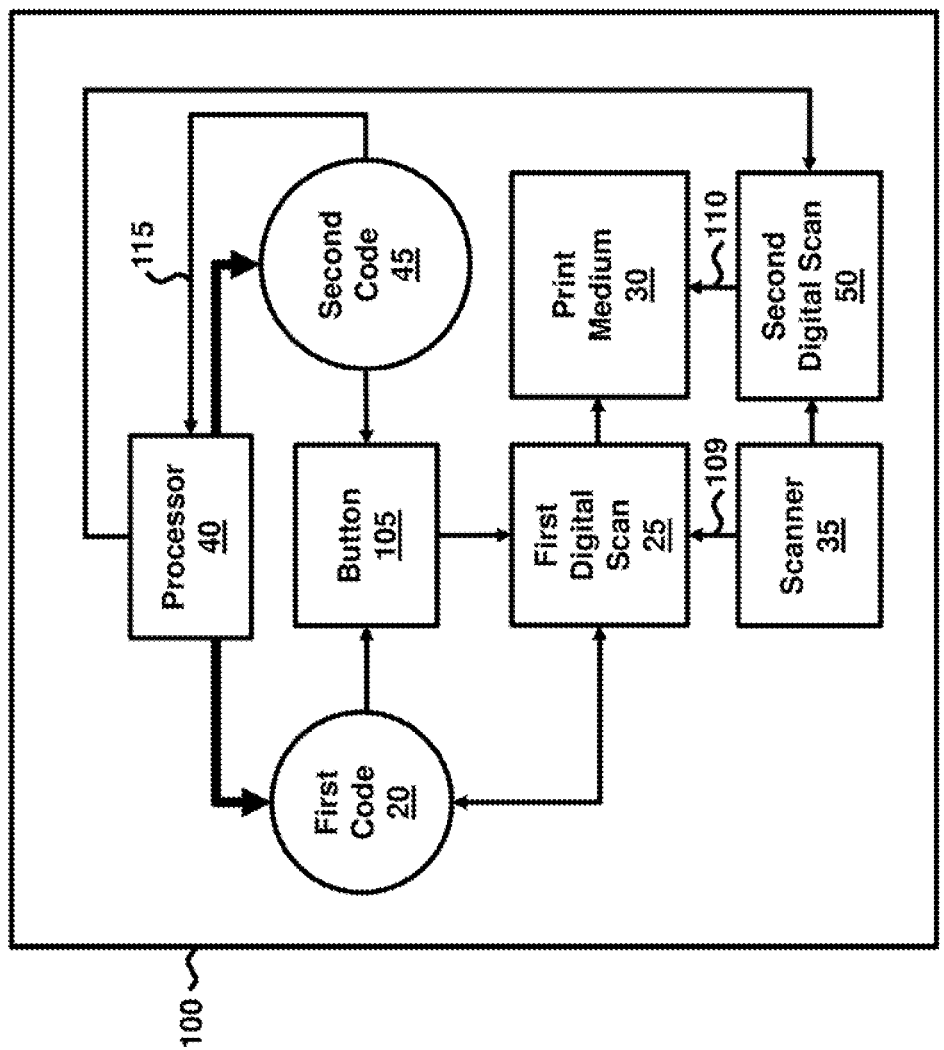
FIG. 7 is a block diagram illustrating a scanning device to correlate codes with digital scans, according to an example.

FIG. 7, with reference to FIGS. 1 through 6, illustrates a scanning device 100 comprising a button 105 to initiate a first digital scan 25 of a print medium 30. In an example, the scanning device 100 may comprise a printer, scanner, copier, or multifunction device containing a combination of printing, scanning, and copying functionalities. For example, the scanning device 100 may contain one or more scanning modules to perform a digital scan of the print medium 30. As indicated above, the term printable or print medium or media may refer to one or more sheets of paper or any other media suitable for insertion into a scanning device 100 such as a printer, scanner, or copier. As described above, the print medium 30 may be any type of print medium including paper, photopolymers, thermopolymers, plastics, composite, metal, wood, etc., and may include any suitable feature including the size, shape, material, thickness, or any other quality suitable for placement in the scanning device 100.

The button 105 may comprise an electro-mechanical button containing an optical sensor, laser rangefinder system, force gauge, or spring force sensor. In another example, the button 105 may comprise a switch and may be a start button associated with the scanning device 10 to start or initiate the first digital scan 25 of the print medium 30. The button 105 is provided to automatically initiate the first digital scan 25 of the print medium 30 upon being pressed or otherwise being engaged. The scanning device 100 may be provided to only permit printing, scanning, or copying upon initiation by the button 105.

A scanner 35 is provided to perform the first digital scan 25 of the print medium 30. In the example shown in FIG. 7, the scanner 35 may include scanning modules that make a digital copy of the print medium 30. In an example, the scanner 35 automatically performs the first digital scan 25 of the print medium 30 once the button 105 is engaged. The digital scan 25 of the print medium 30 may be an electronic digital scan of the print medium 30 or the digital scan 25 may result in a hardcopy print out of a duplicate copy or copies, of the print medium 30.

A processor 40 is provided to generate a first code 20 upon initiation 109 of the first digital scan 25, correlate the first code 20 with a first digital scan 25 of the print medium 30, detect an initiation 110 of a second digital scan 50 of the print medium 30, receive an input 115 of a second code 45, and compare the first code 20 with the second code 45. In the example of FIG. 7, the processor 40 may comprise a CPU of the scanning device 100. In other examples the processor 40 may be a discrete component independent of other processing components in the scanning device 100. In other examples, the processor 40 may be a microprocessor, controller, hardware engine, hardware pipeline, and/or other hardware-enabled device suitable for receiving, processing, operating, and performing various functions required by the scanning device 100. The processor 40 may be provided in the scanning device 100, coupled to the scanning device 100, or communicatively linked to the scanning device 100 from a remote networked location according to various examples.

As described above, the first code 20 may be an alpha-numeric and/or symbol string of characters, a digital image, or any other type of suitable password that is user-specific, and may be automatically generated by the processor 40 or it may be user-generated. The initiation 109 of the first digital scan 25 may occur once the button 105 is engaged. Moreover, the generation of the first code 20 may automatically occur by initiation 109 of the first digital scan 25 of the print medium 30 by the button 105.

The correlation of the first code 20 with the first digital scan 25 of the print medium 30 may occur by linking or otherwise associating the first code 20 with the first digital scan 25 of the print medium 30. For example, the processor 40 may automatically assign the first digital scan 25 of the print medium 30 the specific first code 20 once the scanner 35 performs the first digital scan 25 of the print medium 30 by updating the firmware of the scanning device 100 or by appending the first code 20 to a file name or directory associated with the first digital scan 25 of the print medium 30.

The detection, by the processor 40, of the initiation 110 of the second digital scan 50 of the print medium 30 may occur automatically once the button 105 is re-engaged after the first digital scan 25 of the print medium 30 occurs. In an example, the processor 40 may receive the input 115 of the second code 45 by receiving the input 115 directly on the scanning device 100; e.g., through the button 105, etc., or indirectly to the scanning device 100 by way of a remote communication protocol. The second code 45 may be an alphanumeric and/or symbol string of characters, a digital image, or any other type of suitable password that is user-specific, and may be automatically generated by the processor 40 or it may be user-generated. The processor 40 may receive the second code 45 after the processor 40 generates the first code 20. For example, the processor 40 may generate the first code 20 that is associated with, and input by, a first user once the button 105 initiates 109 the first digital scan 25 of the print medium 30 by the scanner 35. Then, the first user may walk away from the scanning device 100 leaving behind the print medium 30 in the scanning device 100. Thereafter, a second user may engage the scanning device 100 by inputting 115 the second code 45 that may be associated with the second user.

The processor 40 compares the first code 20 with the second code 45. In this regard, the first code 20 that is generated by the processor 40 is retained in memory or cache or provided as a firmware update, etc. by the scanning device 100. More specifically, the correlation of the first code 20 with the first digital scan 25 of the print medium 30 is retained in memory or cache or provided as a firmware update, etc. by the scanning device 100. Once the second code 45 is input 115 in the scanning device 100 in order to initiate 110 the second digital scan 50 of the print medium 30, the processor 40 compares the digital signatures associated with the first code 20 and the second code 45 to determine whether there is a match between the first code 20 and the second code 45. More specifically, the correlation of the first code 20 with the first digital scan 25 of the print medium 30 is compared with the digital data associated with the second digital scan 50 of the print medium 30.

If there is a match between the first code 20 and the second code 45 then the processor 40 transmits a signal to the scanner 35 to continue performing the second digital scan 50 of the print medium 30. However, if there is not a match between the first code 20 and the second code 45, then the processor 40 either does not transmit a signal to the scanner 35 thereby preventing the continued performance of the second digital scan 50 of the print medium 30 or the processor 40 transmits a signal to the scanner 35 instructing the scanner 35 not to continue to perform the second digital scan 50 of the print medium 30.

In accordance with the examples described above, the first code 20 may be the same as the second code 45 in a scenario where the first user and the second user are the same individual or if the second user has received a full copy of the first code 20 and as such the second code 45 is a duplicate of the first code 20 thereby resulting in a detected match by the processor 40. However, the first code 20 and the second code 45 may be completely separate and distinct from one another in which case there is no match detected by the processor 40.

FIG. 8, with reference to FIGS. 1 through 7, illustrates that the first code 20 and the second code 45 may comprise pin numbers 120a, 120b, respectively. In some examples, the pin numbers 120a, 120b may be an alphanumeric and/or symbol string of characters, a digital image, or any other type of suitable pin number that is user-specific, and may be automatically generated by the processor 40 or it may be user-generated. Additionally, the pin numbers 120a, 120b may be randomly generated by the processor 40. Furthermore, the pin numbers 120a, 120b may be the same as one another in which case there is a match of the first code 20 and the second code 45, or the pin numbers 120a, 120b may be different from one another in which case there is not a match of the first code 20 and the second code 45. It is noted that the pin numbers 120a, 120b provided in FIG. 8 are merely illustrative, examples and, as such, other types of pin numbers are possible in accordance with the examples described herein.

Figure 9:
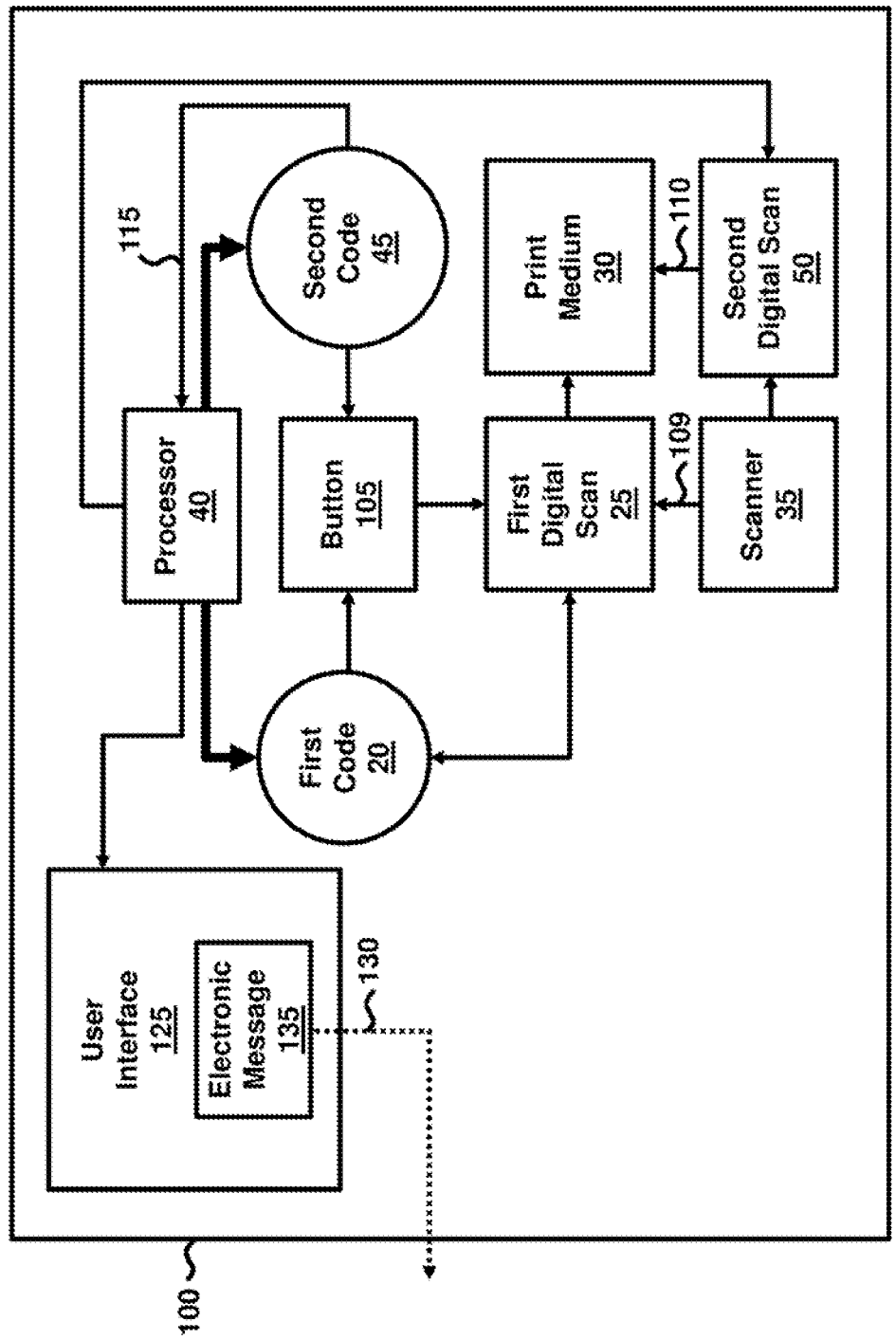
FIG. 9 is a block diagram illustrating the scanning device of FIG. 7 including a user interface to output an electronic message, according to an example.

FIG. 9, with reference to FIGS. 1 through 8, illustrates that the scanning device 100 may comprise a user interface 125 to output 130 an electronic message 135 based on a comparison of the first code 20 with the second code 45. In this regard, the user interface 125 may be part of the scanning device 100 or may be operatively, or communicatively, connected to the scanning device 100. In an example, the user interface 125 may comprise a computer screen, monitor, or other type of display screen. In other examples, the user interface 125 may be a touch screen device or may have buttons for engaging the user interface 125.

The electronic message 135 that is output 130 on the user interface 125 may be an audio, image, or video output 130 or a combination thereof, or any other type of electronic alert transmitted by the user interface 125. In an example, if the first code 20 matches the second code 45, then the electronic message 135 that is output 130 may indicate that the second digital scan 50 of the print medium 30 is permissible. Alternatively, in an example, if the first code 20 does not match the second code 45, then the electronic message 135 that is output 130 may indicate that the second digital scan 50 of the print medium 30 is not permissible, and as such will not occur. For example, a first user may leave the area of the scanning device 100 after completing the first digital scan 25 of the print medium 30, and forget to remove the print medium 30 from the scanning device 100. When a subsequent user attempts to perform the second digital scan 50 of the same print medium 30 and enters the second code 45, if the first code 20 does not match the second code 45, then the user interface 125 will output 130 the electronic message 135.

Figure 10:
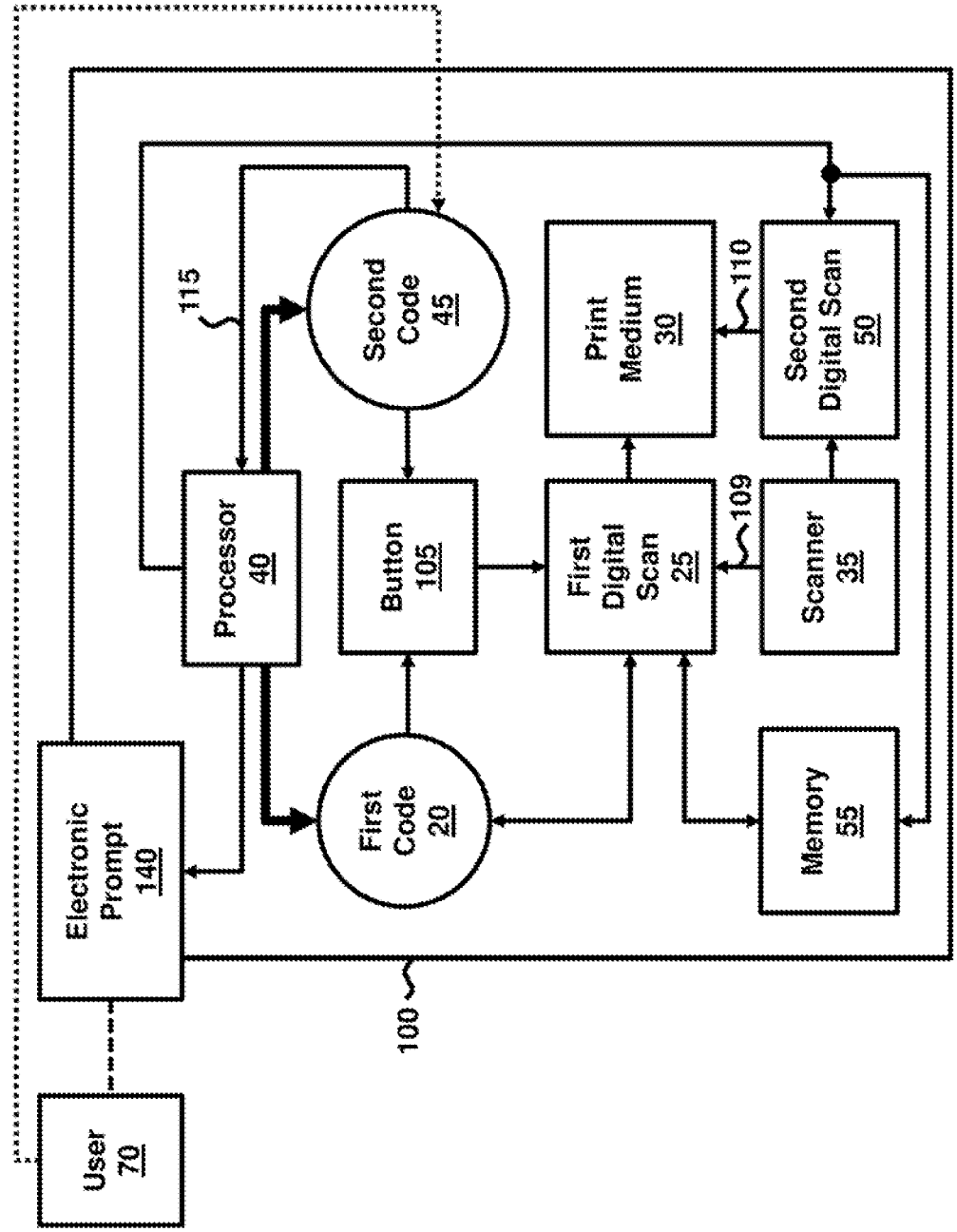
FIG. 10 is a block diagram illustrating the scanning device of FIG. 7 including a memory and initiating an electronic prompt, according to an example.

FIG. 10, with reference to FIGS. 1 through 9, illustrates that the scanning device 100 may comprise a memory 55 to store the first digital scan 25 of the print medium 30, where the processor 40 is to search the memory 55 for the first digital scan 25 of the print medium 30 upon detecting the initiation 110 of the second digital scan 60 of the print medium 30, and initiate an electronic prompt 140 for a user 70 to input the second code 45 to the scanning device 100. In the example of FIG. 10, the memory 55 may be non-volatile memory of the electronic device 10 including flash memory, ROM, PROM, EPROM, or EEPROM. In other examples, the memory 55 may be volatile memory such as a cache memory. The memory 55 may be provided in the scanning device 100, coupled to the scanning device 100, or communicatively linked to the scanning device 100 from a remote networked location according to various examples. The electronic prompt 140 may be an audio prompt, an image prompt, a text prompt, or a video prompt, or a combination thereof. In an example, when a user 70 initiates the first digital scan 25 of the print medium 30 by engaging the button 105, the pin number 120*a* associated with the first code 20 is generated and is, output 130 as an electronic message 135 on the user interface 125. The electronic message 135 may indicate that the print medium 30 will be digitally locked with the pin number 120*a*.

Figure 11:
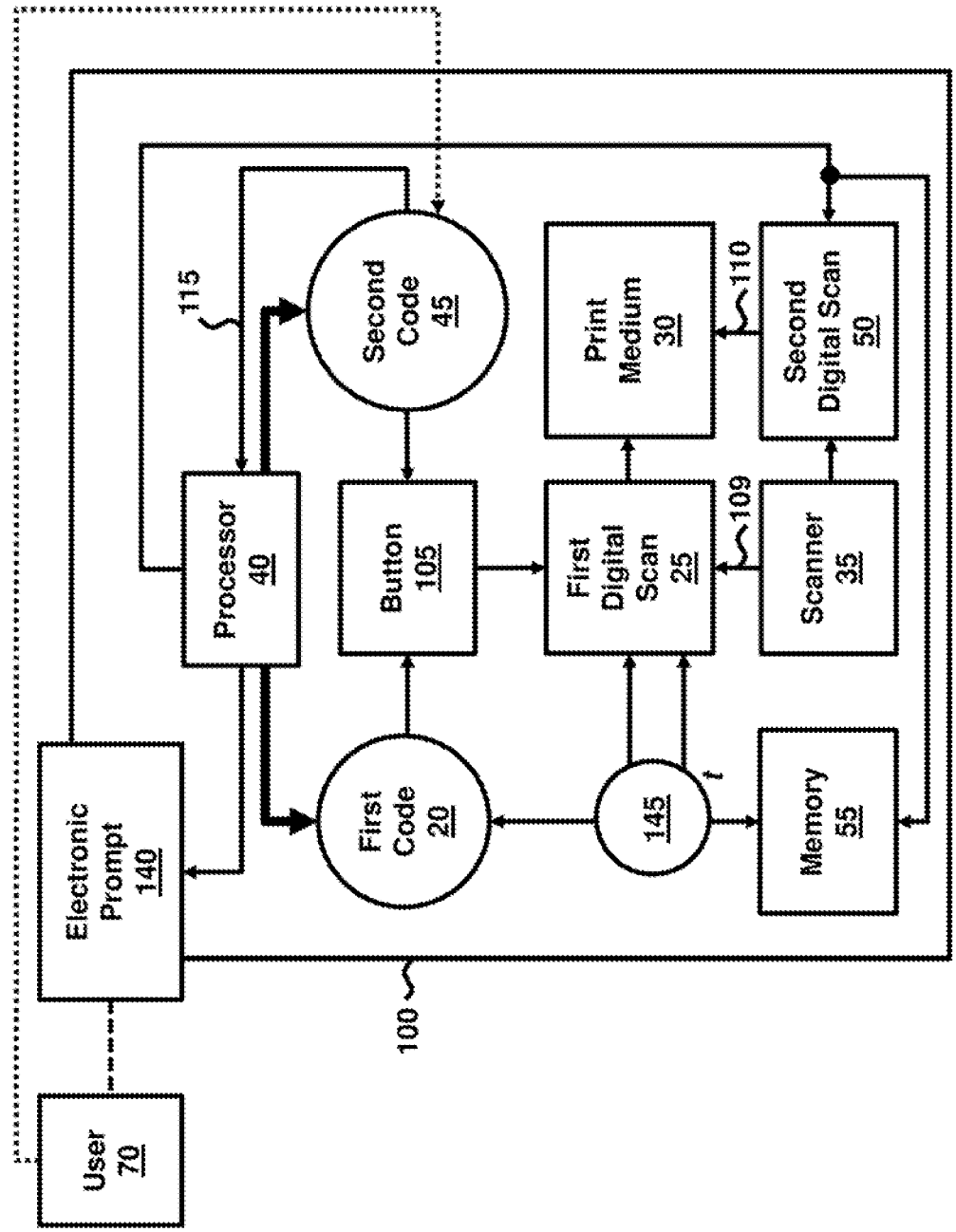
FIG. 11 is a block diagram illustrating the scanning device of FIG. 7 including a memory to store a code and a digital scan of a print medium, according to an example.

FIG. 11, with reference to FIGS. 1 through 10, illustrates that the memory 55 may temporarily store the first code 20 and the first digital scan 25 of the print medium 30 as a correlated pair 145 for a predetermined period of time t. Accordingly, the pin number 120*a* and the digital data associated with the first digital scan 25 are stored as the correlated pair 145 in the memory 55 for the predetermined period of time t. In various examples, the predetermined period of time t may range from a few seconds to several minutes. In an example, the predetermined period of time t may be between approximately three minutes and ten minutes. By temporarily storing the correlated pair 145 of the first code 20 and the first digital scan 25 for only the predetermined period of time t, system resources and storage requirements for the memory 55 may be eased. When a request is made for the second digital scan 50 of the print medium 30 occurs, the processor 40 may search the memory 55 for the correlated pair 145, and if processor 40 detects that the print medium 30 is still present in the scanning device 100, then the processor 40 initiates the electronic prompt 140 for the user 70 to input the second code 45; e.g., pin number 120*b*, to the scanning device 100. Thereafter, the user 70 enters the pin number 120*b* and the processor 40 compares pin number 120*a* with pin number 120*b*, and if there is a match between the two, then the second, digital scan 50 of the print medium 30 is permitted.

Figure 12:
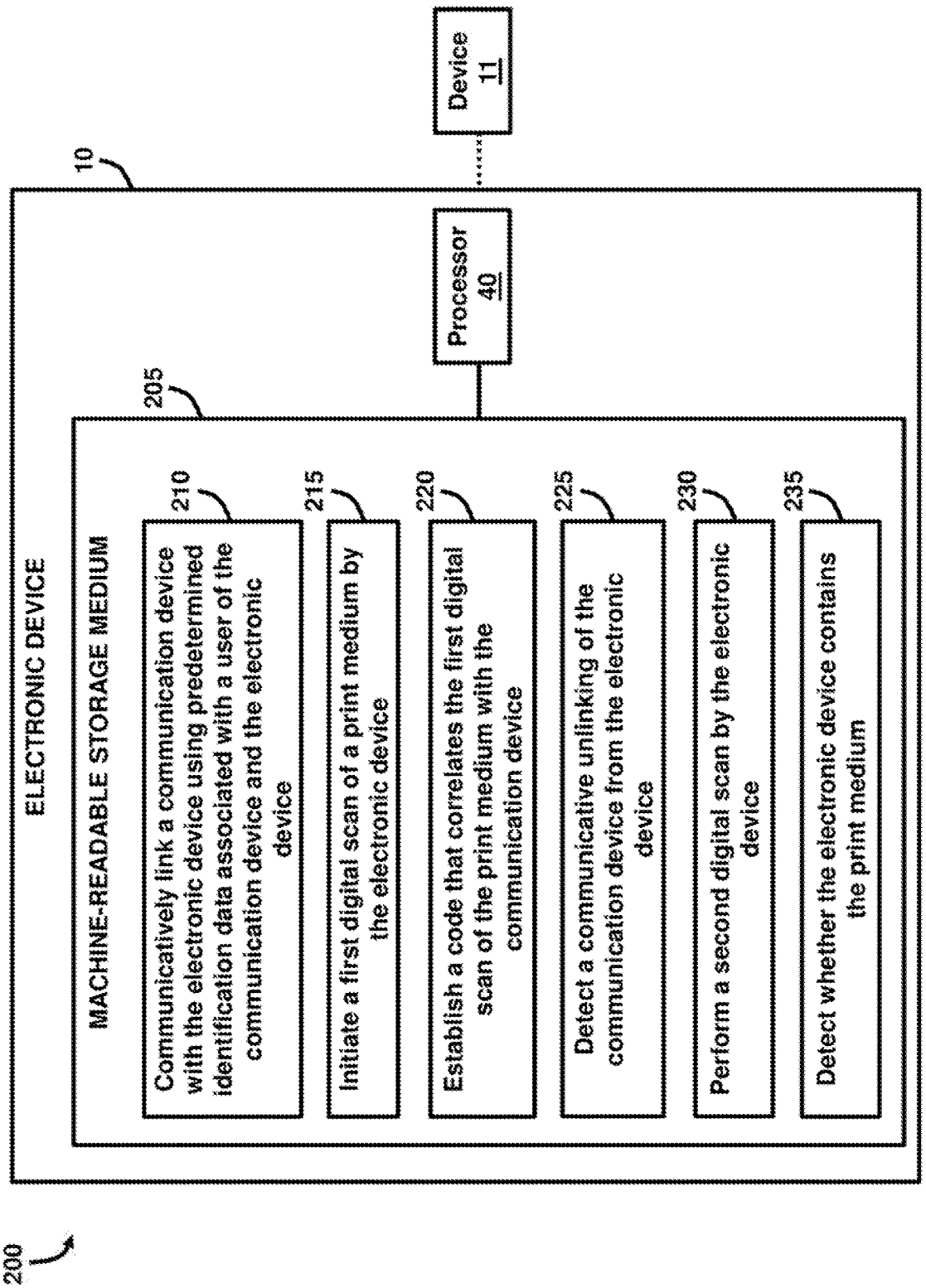
FIG. 12 is a block diagram illustrating a system that uses codes to detect a presence of a print medium in an electronic device, according to an example.

FIG. 12, with reference to FIGS. 1 through 11, illustrates an example system 200 to protect scanned and/or copied confidential material. In the example of FIG. 12, the electronic device 10 includes the processor 40 and a machine-readable storage medium 205. Processor 40 may include a central processing unit, microprocessors, hardware engines, and/or other hardware devices suitable for retrieval and execution of instructions stored in a machine-readable storage medium 205. Processor 40 may fetch, decode, and execute computer-executable instructions 210, 215, 220, 225, 230, and 235 to enable execution of locally-hosted or remotely-hosted applications for controlling action of the electronic device 10. The remotely-hosted applications may be accessible on one or more remotely-located devices; for example, communication device 11. For example, the communication device 11 may be a computer, tablet device, smartphone, or remote server. As an alternative or in addition to retrieving and executing instructions, processor 40 may include one or more electronic circuits including a number of electronic components for performing the functionality of one or more of the instructions 210, 215, 220, 225, 230, and 235.

The machine-readable storage medium 203 may be any electronic, magnetic, optical, or other physical storage device that stores executable instructions. Thus, the machine-readable storage medium 205 may be, for example, random access memory, an EEPROM, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the machine-readable storage medium 205 may include a non-transitory computer-readable storage medium. The machine-readable storage medium 205 may be encoded with executable instructions for enabling execution of remotely-hosted applications accessed on the one or more remotely-located communication devices 11.

In an example, the processor 40 of the electronic device 10 executes the computer-executable instructions 210, 215, 220, 225, 230, 235. For example, linking instructions 210 may communicatively link a communication device 11 with the electronic device 10 using predetermined identification data 65 associated with a user 70 of the communication device 11 and the electronic device 10. The communicatively linked communication device 11 and electronic device 10 may be a wireless connection in accordance with an example using communication network protocols. In an example, the identification data 65 may include various types of information associated with the user 70 including any of a phone number, email address, identification number, social security number, image/photograph, and any other type of identifier. According to an example, the user 70 may be a pre-registered user 70 that provides the identification data 65, which may be stored in the electronic device 10 or may be provided as part of firmware updates to the electronic device 10, or may be remotely stored in the communication device 11 or another remote device that is accessible by the processor 40 of the electronic device 10.

Initiating instructions 215 may initiate 109 a first digital scan 25 of a print medium 33 by the electronic device 10. The initiation 109 of the first digital scan 25 of the print medium 30 may occur automatically upon the engagement of a sensor 15 or a button 105 of the electronic device 10, according to an example. Establishing instructions 220 may establish a code; e.g., first code 20, that correlates the first digital scan 25 of the print medium 30 with the communication device 11. In this regard, the correlation of the first digital scan 25 of the print medium 30 with the communication device 10 creates a correlated mapping 60, which may comprise identification data 65 associated with a user 70 of the communication device 11 who is using the electronic device 10.

Detecting instructions 225 may detect a communicative unlinking of the communication device 11 from the electronic device 10. For example, the communicative unlinking may occur when a wireless connection between the electronic device 10 and the communication device 11 terminates. Performing instructions 230 may perform a second digital scan 50 by the electronic device 10. In this regard, the second digital scan 50 is performed to determine the presence of any print medium 30 in the electronic device 10. Detecting instructions 235 may detect whether the electronic device 10 contains the print medium 30. According to an example, the detection of whether the electronic device 10 contains the print medium 30 may occur within a predefined duration of time; e.g., approximately three minutes, etc., after completion of the first digital scan 25. In an example, the computer-executable instructions 210, 215, 220, 225, 230, and 235, when executed, further cause the processor 40 to transmit an electronic communication 75 to the communication device 11 upon detecting that the electronic device 10 contains the print medium 30. In an example, the electronic communication 75 may be an email message, SMS text message, phone call, or any other type of electronic alert transmitted to the user 70 from the electronic device 10 to the communication device 11.

Figure 13:
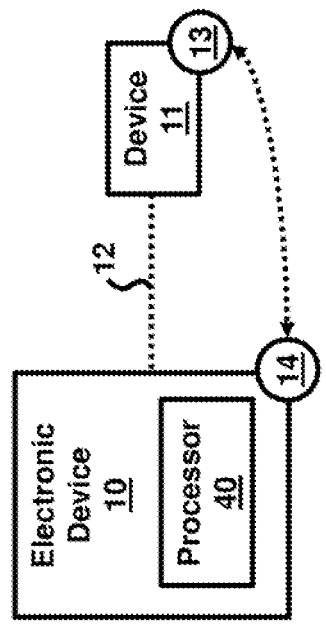
FIG. 13 is a block diagram illustrating the system of FIG. 12 with a near field communication transmission protocol link between a communication device and an electronic device, according to an example.

In the example shown in FIG. 13, with reference to FIGS. 1 through 12, the computer-executable instructions 210, 215, 220, 225, 230, and 235, when executed, further cause the processor 40 to communicatively link the communication device 11 with the electronic device 10 using a near field communication transmission protocol 12 such as a Bluetooth® protocol or using near field communication tags, etc. that has suitable communication mechanisms in both the electronic device 10 and the communication device 11 to establish the communicative link between the devices 10, 11. In an example, the communication device 11 may contain a software application 13; e.g., a mobile app, etc. that communicatively links with a corresponding software application 14 of the electronic device 10 using the near field communication protocol 12.

Figure 14:
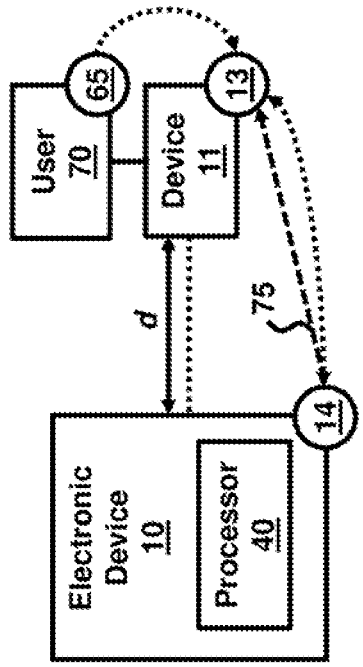
FIG. 14 is a block diagram illustrating the system of FIG. 12 with an automatic link between a communication device and an electronic device, according to an example.

In the example shown in FIG. 14, with reference to FIGS. 1 through 13, the computer-executable instructions 210, 215, 220, 225, 230, and 235, when executed, further cause the processor 40 to automatically communicatively link the communication device 11 with the electronic device 10 upon the communication device 11 being positioned within a predetermined distance d away from the electronic device 10. In accordance with the near field communication protocol 12, once the communication device 11 enters within the predetermined distance d away from the electronic device 10, the communication device 11 automatically becomes paired; e.g., communicatively linked, with the electronic device 10. The identification data 65; e.g., mobile telephone number, email address, etc., associated with the user 70 of the communication device 11 is then transferred from the communication device 11 to the electronic device 10.

The user 70 may then perform a scan or copy; e.g., first digital scan 25, of the print medium 30. Afterwards, the user 70 may leave the vicinity of the electronic device 10; e.g., outside of the predetermined distance d, and when the communicative unpairing of the electronic device 10 with the communication device 11 occurs, the electronic device 10 may perform a second digital scan 50 and if there is any print medium 30 detected by the processor 40 in the electronic device 10, the processor 40 transmits an electronic communication 75: e.g., from the software application 14 of the electronic device 10 to the software application 13 of the communication device 11 informing the user 70 that he/she has to retrieve the print medium 30 from the electronic device 10.

The various examples described herein provide techniques to safeguard confidential information by preventing inadvertent or unauthorized scanning or copying of a print medium 30, particularly in situations where a user 70 accidently leaves a print medium 30 in an electronic device 10 or a scanning device 100 after completing a scan or copy job. Electronic alerts via an electronic communication 75 or electronic message 135 either directly presented on the electronic device 10 or the scanning device 100 or transmitted to a communication device 11 of the user 70 may provide reminders to the user 70 to retrieve the print medium 30 that may have been accidently left behind in the electronic device 10 or scanning device 100. Furthermore, techniques provided by the examples above may include hardware and software implementations, or a combination of both, to the electronic device 10 or scanning device 100 to provide the functions to safeguard the confidential information associated with the print medium 30.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device comprising:
    a sensor to detect a first code and initiate a first digital scan of a print medium;
    a scanner to perform the first digital scan of the print medium upon detection of the first code by the sensor;
    a memory to store the first digital scan of the print medium; and
    a processor to:
        correlate the first code with the first digital scan of the print medium;
        identify a second code detected by the sensor;
        detect a second digital scan of the print medium by the scanner;
        search the memory for the first digital scan of the print medium upon detecting the initiation of the second digital scan of the print medium;
        compare the first code with the second code; and
        initiate an electronic prompt for a user to input the second code to the electronic device.

2. The electronic device of claim 1, comprising a memory to store the first digital scan of the print medium for a predetermined period of time, wherein the processor is to create a correlated mapping of the first code with the first digital scan of the print medium, and delete the correlated mapping after the predetermined period of time.

3. The electronic device of claim 2, wherein the correlated mapping comprises identification data associated with a user of the electronic device.

4. The electronic device of claim 1, wherein the processor is to delete the second digital scan upon determining that the first code does not match the second code.

5. The electronic device of claim 1, wherein the processor is to transmit an electronic communication upon determining that the first code does not match the second code.

6. The electronic device of claim 1, wherein the first code comprises a first fingerprint, and wherein the second code comprises a second fingerprint.

7. A scanning device comprising:
    a button to initiate a first digital scan of a print medium;
    a scanner to perform the first digital scan of the print medium;
    a memory to store the first digital scan of the print medium; and
    a processor to:
        generate a first code upon initiation of the first digital scan;
        correlate the first code with a first digital scan of the print medium;
        detect an initiation of a second digital scan of the print medium;
        search the memory for the first digital scan of the print medium upon detecting the initiation of the second digital scan of the print medium;
        initiate an electronic prompt for a user to input the second code to the scanning device;
        receive an input of a second code; and
        compare the first code with the second code.

8. The scanning device of claim 7, wherein the first code and the second code comprise pin numbers.

9. The scanning device of claim 7, comprising a user interface to output an electronic message based on a comparison of the first code with the second code.

10. The scanning device of claim 7, wherein the memory temporarily stores the first code and the first digital scan of the print medium as a correlated pair for a predetermined period of time.

11. A non-transitory machine-readable storage medium comprising computer-executable instructions that when executed cause a processor of an electronic device to:
communicatively link a communication device with the electronic device using predetermined identification data associated with a user of the communication device and the electronic device;
initiate a first digital scan of a print medium by the electronic device;
establish a code that correlates the first digital scan of the print medium with the communication device;
store the first digital scan of the print medium;
detect a communicative unlinking of the communication device from the electronic device;
receive a request to perform a second digital scan by the electronic device;
detect whether the electronic device contains the print medium;
search the memory for the first digital scan of the print medium upon detecting the request to perform the second digital scan of the print medium;
initiate an electronic prompt for a user to input a second code;
receive the second code; and
compare the first code with the second code.

12. The non-transitory machine-readable storage medium of claim 11, wherein the instructions, when executed, further cause the processor to transmit an electronic communication to the communication device upon detecting that the electronic device contains the print medium.

13. The non-transitory machine-readable storage medium of claim 11, wherein the instructions, when executed, further cause the processor to communicatively link the communication device with the electronic device using a near field communication transmission protocol.

14. The non-transitory machine-readable storage medium of claim 11, wherein the instructions, when executed, further cause the processor to automatically communicatively link the communication device with the electronic device upon the communication device being positioned within a predetermined distance away from the electronic device.

* * * * *